United States Patent [19]

Divsalar et al.

[11] Patent Number: 5,017,883
[45] Date of Patent: May 21, 1991

[54] MULTIPLE SYMBOL DIFFERENTIAL DETECTION

[75] Inventors: Dariush Divsalar, Pacific Palisades; Marvin K. Simon, La Canada, both of Calif.

[73] Assignee: The United States of America as represented by the Administrator of the National Aeronautics and Space Administration, Washington, D.C.

[21] Appl. No.: 560,691

[22] Filed: Jul. 31, 1990

[51] Int. Cl.$^5$ .......................................... H04L 27/22
[52] U.S. Cl. ................................... 329/304; 375/53; 375/56; 375/85; 375/86
[58] Field of Search ................... 329/304, 305, 310; 375/52-57, 83-87

[56] References Cited

U.S. PATENT DOCUMENTS

| | | | |
|---|---|---|---|
| 4,189,677 | 2/1980 | Cooper et al. | 375/1 |
| 4,439,863 | 3/1984 | Bellamy | 375/18 |
| 4,675,884 | 6/1987 | Nakamura et al. | 375/87 |
| 4,713,817 | 12/1987 | Wei | 371/43 |
| 4,714,892 | 12/1987 | Ishizuka | 375/82 X |
| 4,942,591 | 7/1990 | Nease et al. | 329/304 X |

FOREIGN PATENT DOCUMENTS 2752468 5/1979 Fed. Rep. of Germany .

OTHER PUBLICATIONS

Abstract–IEEE Global Telecommunication Conference & Exhibition, Communication for the Information Age Conference Record Adaptive Direct-Sequence Spread-Spectrum Receiver for Operation in Fading Channels with Narrowband Interferences, Conference Location: Hollywood, Fla., Date: 1988 Nov. 28–Dec. 1, Published by IEEE, New York, 1988.

Primary Examiner—Siegfried H. Grimm
Attorney, Agent, or Firm—Thomas H. Jones; Harold W. Adams; John R. Manning

[57] ABSTRACT

A differential detection technique for MPSL signals is provided which uses a multiple symbol observation interval on the basis of which a joint decision is made regarding the phase of the received symbols. In accordance with the invention, a first difference phase is created between first and second received symbols. Next the first difference phase is correlated with the possible values thereof to provide a first plurality of intermediate output signals. A second difference phase is next created between second and third received symbols. The second difference phase is correlated with plural possible values thereof to provide a second plurality of intermediate output signals. Next, a third difference phase is created between the first and third symbols. The third difference phase is correlated with plural possible values thereof to provide a third plurality of intermediate output signals. Each of the first plurality of intermediate outputs are combined with each of the second plurality of intermediate outputs and each of the third plurality of intermediate outputs to provide a plurality of possible output values. Finally, a joint decision is made by choosing from the plurality of possible output values the value which represents the best combined correlation of the first, second and third difference values with the possible values thereof.

4 Claims, 4 Drawing Sheets

MULTIPLE SYMBOL DIFFERENTIAL DETECTION

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Field of the Invention

The present invention relates to communication systems. More specifically, the present invention relates to differential detection of multiple phase shift keyed signals.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

As is well known in the art, differential detection schemes utilize a phase reference provided by a previously transmitted symbol to establish a phase reference for the demodulation of a currently received symbol. Differential detection is an attractive alternative to coherent detection in applications where simplicity and robustness of implementation take precedence over optimal system performance. In addition, differential detection may be the only alternative in severely degraded transmission environments, e.g., multipath fading channels, in which acquisition and tracking of coherent demodulation reference signals is difficult if not impossible.

In the past, differential detection of multiple-phase-shift keying (MPSK) has been accomplished by comparing the received phase in a given symbol interval with that in the previous symbol interval and making a multilevel decision on the difference between these two phases. See "Investigation of Digital Data Communication Systems," by J. G. Lawton, Report No. UA-1420-S-1, Cornell Aeronautical Laboratory, Inc. Buffalo, N.Y., Jan. 3, 1961. (Also available as ASTIA Document No. 256 584.) In *Telecommunication Systems Engineering*, published in 1973 by Prentice-Hall of Englewood Cliffs, N.J., at page 240-252, authored by W. C. Lindsey and M. K. Simon provide an implementation of such a receiver and the analysis of its error rate performance on an additive white Gaussian noise (AWGN) channel. In arriving at the results in these works, the assumption was made that the received carrier reference phase is constant over at least two symbol intervals so that its effect on the decision process cancels out when the above-mentioned phase difference is taken. This assumption is critical to the analysis but is also realistic in many practical applications. Also, since the information is carried in the difference between adjacent received phases, the input information must be differentially encoded before transmission over the channel.

Although differential detection eliminates the need for carrier acquisition and tracking in the receiver, it suffers from a performance penalty (additional required signal-to-noise ratio (SNR) at a given bit error rate) when compared with ideal (perfect carrier phase reference) coherent detection. The amount of this performance penalty increases with the number of phases, M, and is significant for $M \geq 4$. For example, at a bit error probability $P_b = 10^{-5}$, differentially detected binary phase shift keyed, BPSK, (often abbreviated as DPSK) requires approximately 0.75 dB more bit energy-to-noise ratio ($E_b/N_o$) than coherently detected BPSK (with differential encoding and decoding). For QPSK (M=4), the difference between differential detection and ideal coherent detection (with differential encoding and decoding), at a bit error probability $P_b = 10^{-5}$, is about 2.2 dB. Finally, for 8PSK, the corresponding difference in performance between the two is greater than 2.5 dB.

Thus, there is a need in the art for an improvement over the conventional (two symbol observation) differential detection technique so as to recover a portion of the performance lost relative to that of coherent detection while maintaining a simple and robust implementation. That is, there is a need in the art for an improvement in the conventional differential detection scheme with minimal additional complexity.

SUMMARY OF THE INVENTION

The need in the art is addressed by the present invention which provides a differential detection technique for MPSK signals which uses a multiple symbol observation interval on the basis of which a joint decision is made regarding the phase of the received symbols.

In accordance with the invention, a first difference phase is created between first and second received symbols. Next the first difference phase is correlated with the possible values thereof to provide a first plurality of intermediate output signals. A second difference phase is next created between second and third received symbols. The second difference phase is correlated with plural possible values thereof to provide a second plurality of intermediate output signals. Next, a third difference phase is created between the first and third symbols. The third difference phase is correlated with plural possible values thereof to provide a third plurality of intermediate output signals. Each of the first plurality of intermediate outputs are combined with each of the second plurality of intermediate outputs and each of the third plurality of intermediate outputs to provide a plurality of possible output values for the phase of the second and third symbols. Finally, a joint decision is made with respect to the output values for the phase of the second and third symbols by choosing from the plurality of possible output values the value which represents the best combined correlation of the first, second and third difference values with the possible values thereof.

DESCRIPTION OF THE INVENTION

Figure 1:
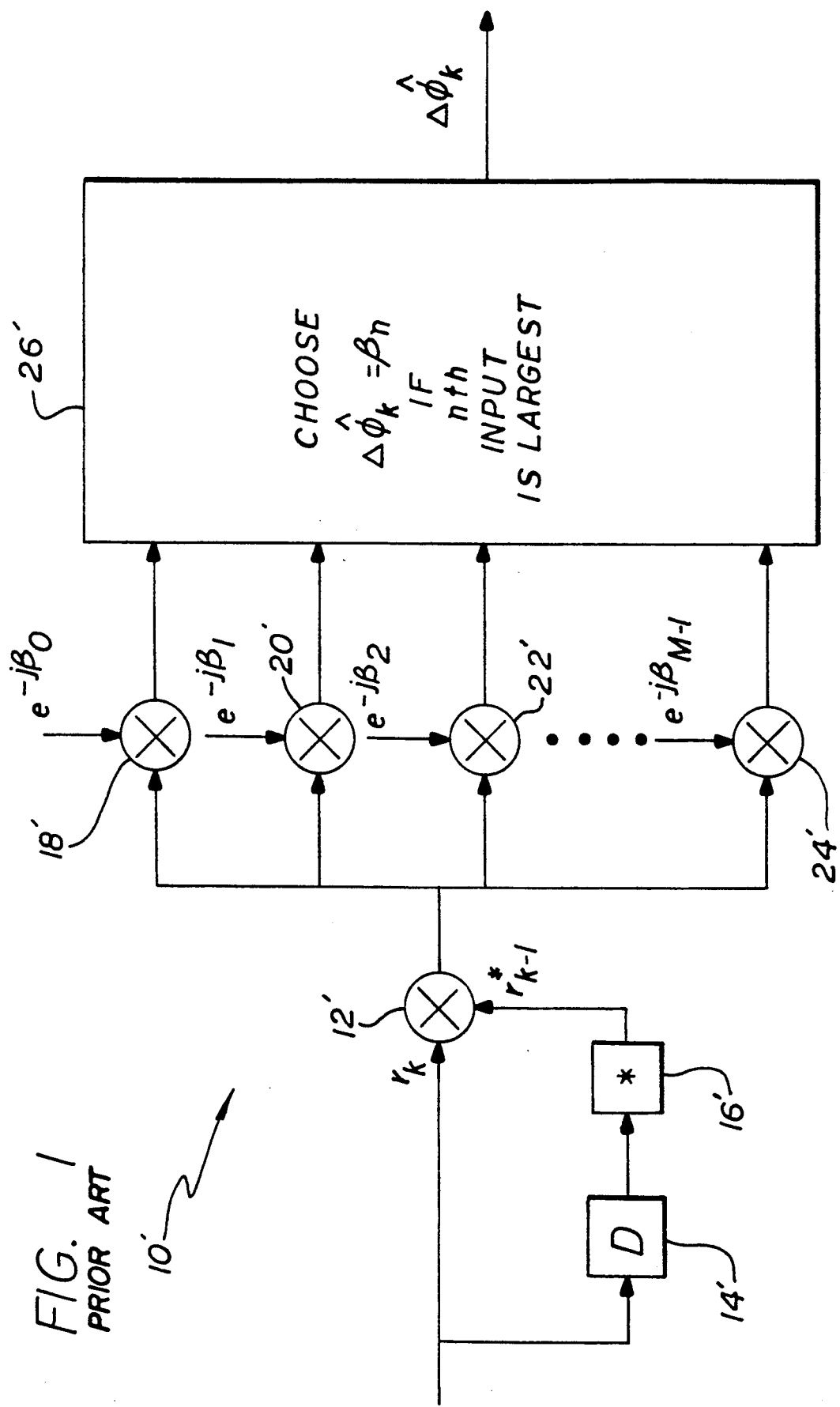
FIG. 1 is a functional block diagram in complex form of an illustrative parallel implementation of a conventional differential detector for MPSK signals.

Illustrative embodiments and exemplary applications will now be described with reference to the accompanying drawings to disclose the advantageous teachings of the present invention.

The transmission of an MPSK signal over an AWGN channel in the interval $kT \leq t \leq (k+1)T$ has the complex form $$s_k = (2P)^{\frac{1}{2}} e^{j\phi_k} \qquad [1]$$

where P denotes the constant signal power, T denotes the MPSK symbol interval, and $\phi_k$ the transmitted phase which takes on one of M uniformly distributed values $\beta_m = 2\pi m/M$; $m=0, 1, \ldots, M-1$ around the unit circle. The corresponding received signal is then $$r_k = s_k e^{j\theta_k} + n_k \qquad [2]$$

where $n_k$ is a sample of zero mean complex Gaussian noise with variance $$\sigma_n^2 = 2N_o/T \qquad [3]$$

and $\theta_k$ is an arbitrary phase introduced by the channel which, in the absence of any side information, is assumed to be uniformly distributed in the interval $(-\pi, \pi)$.

Consider now a received sequence of length N and assume that $\theta_k$ is independent of k over the length of this sequence, i.e., $\theta_k = \theta$. Analogous to equation [2], the received sequence $\underline{r}$ is expressed as $$\underline{r} = \underline{s} e^{j\theta} + \underline{n} \qquad [4]$$

where $r_k$, $s_k$, and $n_k$ are, respectively, the kth components of the N-length sequences $\underline{r}$, $\underline{s}$, and $\underline{n}$. For the assumed AWGN model the conditional probability of $\underline{r}$ given $\underline{s}$ and $\theta$ is $$p(\underline{r}|\underline{s},\theta) = (1/(2\pi\sigma_n^2)^N) \exp\{-\|\underline{r} - \underline{s}e^{j\theta}\|^2/2\sigma_n^2\} \qquad [5]$$

where $$\|\underline{r} - \underline{s}e^{j\theta}\|^2 = \sum_{i=0}^{N-1} |r_{k-i} - s_{k-i}e^{j\theta}|^2 \qquad [6]$$

Simplifying the right hand side of equation [6] results $$\|\underline{r} - \underline{s}e^{j\theta}\|^2 = \sum_{i=0}^{N-1} [|r_{k-i}|^2 + |s_{k-i}|^2] - 2Re\left\{\sum_{i=0}^{N-1} r_{k-i} s_{k-i}^*\right\} \cos\theta - 2Im\left\{\sum_{i=0}^{N-1} r_{k-i} s_{k-i}^*\right\} \sin\theta \qquad [7]$$

$$= \sum_{i=0}^{N-1} [|r_{k-i}|^2 + |s_{k-i}|^2] - 2\left|\sum_{i=0}^{N-1} r_{k-i} s_{k-i}^*\right| \cos(\theta - \alpha)$$

where $$\alpha = \tan^{-1} Im\left\{\sum_{i=0}^{N-1} r_{k-i} s_{k-i}^*\right\} / Re\left\{\sum_{i=0}^{N-1} r_{k-i} s_{k-i}^*\right\} \qquad [8]$$

and * represents the complex conjugate operation.

Since $\theta$ has been assumed to be uniformly distributed, then the conditional probability of $\underline{r}$ given $\underline{s}$ is simply $$p(\underline{r}|\underline{s}) = \int_{-\pi}^{\pi} p(\underline{r}|\underline{s},\theta) p(\theta) d\theta \qquad [9]$$

$$= \exp\left\{(-1/2\sigma_n^2) \sum_{i=0}^{N-1} [|r_{k-i}|^2 + |s_{k-i}|^2]\right\} I_0\left((1/\sigma_n^2) \left|\sum_{i=0}^{N-1} r_{k-i} s_{k-i}^*\right|\right) \div (2\pi\sigma_n^2)^N$$

where $I_0(x)$ is the zeroth order modified Bessel function of the first kind. Note that for MPSK, $|s_k|^2$ is constant for all phases. Thus, since $I_0(x)$ is a monotonically increasing function of its argument, maximizing $p(\underline{r}|\underline{s})$ over $\underline{s}$ is equivalent to finding $$\max_{\underline{s}} \left|\sum_{i=0}^{N-1} r_{k-i} s_{k-i}^*\right|^2 \qquad [10]$$

which, using equation [1], results in the decision rule $$\text{choose } \underline{\tilde{\phi}} \text{ if } \left|\sum_{i=0}^{N-1} r_{k-i} e^{-j\tilde{\phi}_{k-i}}\right|^2 \qquad [11]$$

where $\underline{\tilde{\phi}}$ is a particular sequence of the $\beta_m$'s. Note that this decision rule has a phase ambiguity associated with it since an arbitrary fixed phase rotation of all N estimated phases $\tilde{\phi}_k, \tilde{\phi}_{k-1}, \ldots, \tilde{\phi}_{k-N+1}$ results in the same decision for $\underline{\tilde{\phi}}$. Thus, $$\eta \stackrel{\Delta}{=} \left|\sum_{i=0}^{N-1} r_{k-i} e^{-j(\tilde{\phi}_{k-i} - \tilde{\phi}_{k-N+1})}\right|^2 \qquad [12]$$

is a sufficient statistic for decision making.

To resolve the above phase ambiguity, one should differentially encode the phase information at the transmitter. Letting $$\phi_k = \phi_{k-1} + \Delta\phi_k \qquad [13]$$

where now $\Delta\phi_k$ denotes the input data phase corresponding to the kth transmission interval and $\phi_k$ the differentially encoded version of it, then $$\phi_{k-i} - \phi_{k-N+1} = \sum_{m=0}^{N-i-2} \Delta\phi_{k-i-m} \quad [14]$$

and the above decision rule becomes $$\eta = \left| r_{k-N+1} + \sum_{i=0}^{N-2} r_{k-i} e^{-j\Xi_i} \right|^2 \quad [15]$$

where $$\Xi_i = \sum_{m=0}^{N-i-2} \Delta\phi_{k-i-m}$$

As discussed below, the present invention is based on the implication of this statistic that improved performance could result from the observation of the received signal over N symbol time intervals and making a simultaneous decision on N−1 data phases based on this observation.

For N=1, i.e., an observation of the received signal over one symbol interval, equation [15] simplifies to $$\eta = |r_k|^2 \quad [16]$$

which is completely independent of the input data phase and thus cannot be used for making decisions on differentially encoded MPSK modulation. In fact, the statistic of equation [16] corresponds to the classical case of noncoherent detection which is not applicable to phase modulation.

Letting N=2, equation [15] becomes $$\eta = |r_{k-1} + r_k e^{-j\Delta\phi_k}|^2 \quad [17]$$
$$= |r_{k-1}|^2 + |r_k|^2 + 2Re\{r_k r_{k-1}^* e^{-j\Delta\phi_k}\}$$

This results in the well-known decision rule for conventional MDPSK, namely, choose $$\Delta\phi_k \text{ if } Re\{r_k r_{k-1}^* e^{-j\Delta\phi_K}\} \quad [18]$$

is maximum. This is implemented in complex form in the functional block diagram of FIG. 1. It is therefore evident from this approach that conventional differential detection of MPSK is the optimum receiver in the sense of minimizing the symbol error probability given that the unknown carrier phase is constant over two symbol time periods.

In accordance with the teachings of the present invention, a system and technique are provided for the differential detection of MPSK signals which uses a multiple symbol observation interval on the basis of which a joint decision is made regarding the phase of the received symbols. The present invention insures that N≧2. The decision rule for the method and system of the present invention is provided by equation [15] above. For example, with an observation of the received signal over three symbol intervals, N=3 and equation [15] becomes $$\eta = |r_{k-2} + r_k e^{-j(\Delta\phi_k + \Delta\phi_{k-1})} + r_{k-1} e^{-j\Delta\phi_{k-1}}|^2 = \quad [19]$$
$$|r_{k-2}|^2 + |r_{k-1}|^2 + |r_k|^2 + 2Re\{r_k r_{k-2}^* e^{-j(\Delta\phi_k + \Delta\phi_{k-1})}\} +$$

-continued
$$2Re\{r_{k-1} r_{k-2}^* e^{-j\Delta\phi_{k-1}}\} + 2Re\{r_k r_{k-1}^* e^{-j\Delta\phi_k}\}$$

Thus, the decision rule for the system of the present invention becomes choose $\Delta\phi_k$ and $\Delta\phi_{k-1}$ if
$$Re\{r_k r_{k-1}^* e^{-j\Delta\phi_k} + r_{k-1} r_{k-2}^* e^{-j\Delta\phi_{k-1}} + r_k r_{k-2}^* e^{-j(\Delta\phi_k + \Delta\phi_{k-1})}\} \quad [20]$$

is maximum.

Note that the first and second terms of the metric used in the decision rule of equation [20] are identical to those used to make successive and independent decisions on $\Delta\phi_k$ and $\Delta\phi_{k-1}$, respectively, in conventional MDPSK. The third term in the optimum metric is a combination of the first two and is required to make an optimum joint decision on $\Delta\phi_k$ and $\Delta\phi_{k-1}$.

Thus, the mathematical basis has been provided for a receiver implemented on the basis of equation [20] to outperform a conventional MDPSK receiver.

Figure 2:
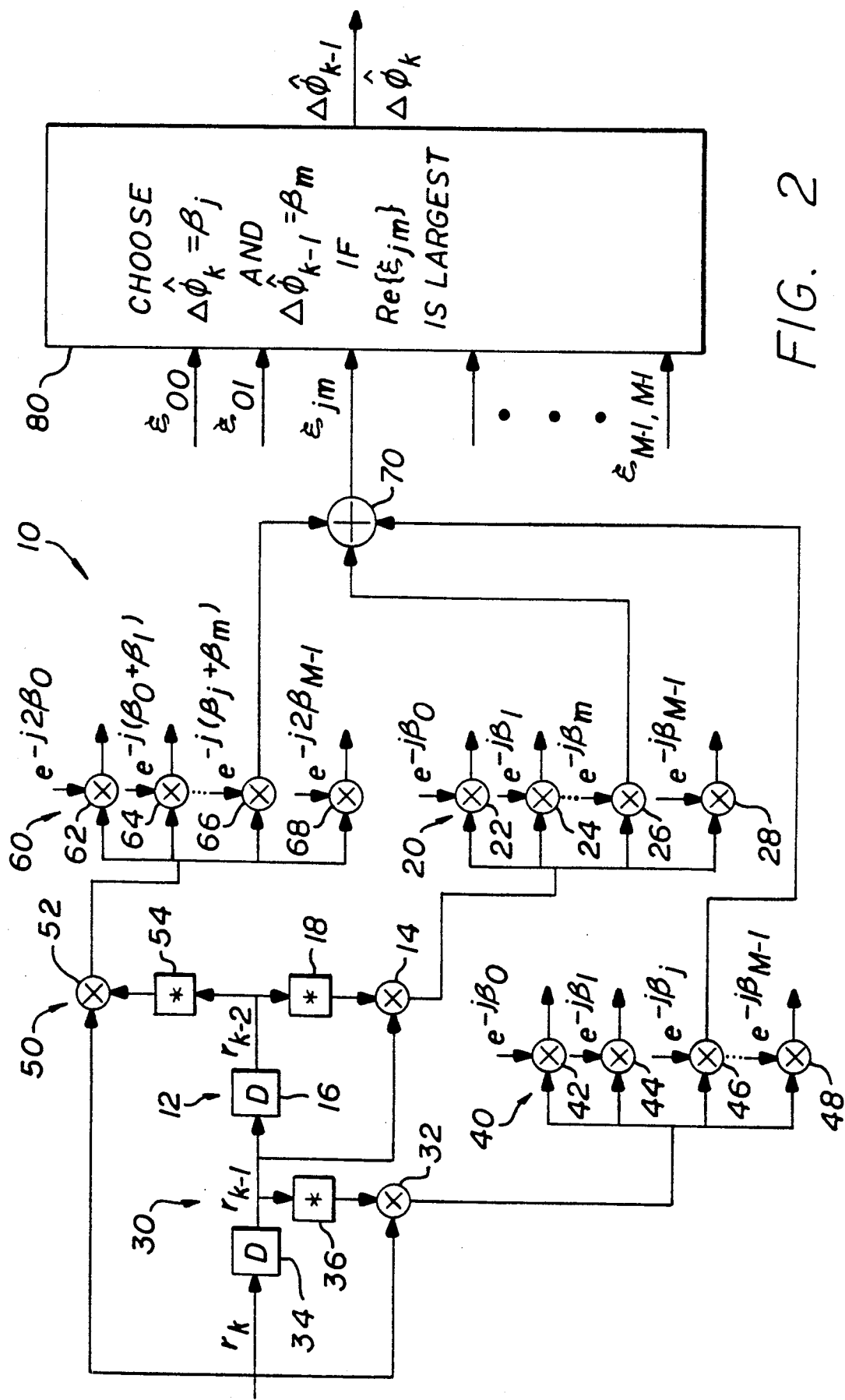
FIG. 2 is a functional block diagram in complex form of an illustrative parallel implementation of a differential detector for MPSK signals constructed in accordance with the teachings of the present invention.

FIG. 2 is a functional block diagram in complex form of an illustrative parallel implementation of a differential detector for MPSK signals 10 constructed in accordance with the teachings of the present invention within the constraints of the decision rule of equation [20].

An understanding of the operation of the differential detector 10 of the present invention is facilitated by a review of the operation of a conventional differential detector 10' as illustrated in FIG. 1. As mentioned above, FIG. 1 is a functional block diagram in complex form of an illustrative parallel implementation of the conventional differential detector 10' for MPSK signals. The conventional detector 10' includes a first correlator 12' for correlating a received symbol $r_k$ with the complex conjugate of a previously transmitted symbol $r_{k-1}$. The previously transmitted symbol $r_{k-1}$ is delayed by conventional delay circuit 14' and conjugated by a conventional conjugating circuit 16'. The output of the conventional correlator 12' (in the absence of noise) is a symbol of the form $e^{j\Delta\phi_k}$ which has one of M possible Values. The term $e^{j\Delta\phi_k}$ represents the phase difference between the transmitted symbols $r_k$ and $r_{k-1}$. To identify the transmitted symbol, M correlators are provided of which four are shown 18', 20', 22', and 24'. Each of the M correlators 18', 20', 22', and 24' correlates the difference phase $e^{j\Delta\phi_k}$ with a different possible value thereof $e^{-j\beta_0}$, $e^{-j\beta_1}$, $e^{-j\beta_2}$, and $e^{-j\beta_{M-1}}$, etc., respectively, provided by a read-only memory (ROM), for example, (not shown). Each of the M correlators 18', 20', 22' and 24' provides an intermediate output from which a decision is made as to the phase of the received symbol $r_k$ by a comparator 26'. That is, the kth difference phase $\Delta\phi_k$ is chosen equal to $\beta_n$ if the nth input is largest (for some n=0, 1, ..., M−1). Hence, the output of the conventional two symbol differential detector 10' is the kth difference phase $\Delta\phi_k = \beta_n$.

Returning now to FIG. 2, the multiple symbol differential detector 10 of the present invention includes a first circuit 12 for creating a first difference phase between first and second received symbols $r_{k-2}$ and $r_{k-1}$. The first circuit 12 includes a first correlator 14, a first delay element 16, a conjugating element 18 and a first set 20 of M intermediate correlators of which four are shown 22, 24, 26, and 28. The delay, conjugating and correlating elements may be implemented by any of the techniques known in the art. The first correlator 14 correlates the second received symbol $r_{k-1}$ with the first received symbol $r_{k-2}$ after it has been delayed by the first delay circuit 16 and conjugated by the first conjugating circuit 18. The conjugating circuit changes the sign of the exponent on the first received complex symbol so that correlation produces a phase difference between the two inputs.

As with the conventional correlator, the output of the first correlator 14 is a symbol of the form $e^{j\Delta\Phi_{k-1}}$ which has one of M possible values. The term $e^{j\Delta\Phi_{k-1}}$ represents the phase difference between the transmitted symbols $r_{k-2}$ and $r_{k-1}$. To provide the basis for a first tentative decision with respect to the transmitted symbol, each of the M correlators 22, 24, 26, and 28 correlates the difference phase $e^{j\Delta\phi_{k-1}}$ with a different possible value thereof $e^{-j\beta_0}$, $e^{-j\beta_1}$, $e^{-j\beta_m}$, and $e^{-j\beta_{M-1}}$, etc. respectively, provided by a read-only memory (ROM), for example, (not shown). Each of the M correlators 22, 24, 26, and 28 provides an intermediate output which contributes to the ultimate joint decision to be made on $\Delta\phi_{k-1}$ and $\Delta\phi_k$ as discussed more fully below. Thus, the first set 20 of correlators 22, 24, 26, and 28 provides means for correlating a first difference phase with plural possible values thereof to provide a first plurality of intermediate output signals.

A second circuit 30 is provided for creating a second difference phase $e^{j\Delta\phi_k}$ between the second received symbol $r_{k-1}$ and a third received symbol $r_k$. The second circuit 30 is identical to the first circuit 12 and includes a second correlator 32, a second delay circuit 34, a second conjugating circuit 36 and a second set 40 of M intermediate correlators of which four are shown 42, 44, 46, and 48, respectively. Each of the M intermediate correlators 42, 44, 46, and 48, correlates the difference phase $e^{j\Delta\phi_k}$ with a different possible value thereof $e^{-j\beta_0}$, $e^{-j\beta_1}$, $e^{-j\beta_j}$, and $e^{-j\beta_{M-1}}$, etc., and provides an intermediate output from which a second contribution is made to the ultimate joint decision on $\Delta\phi_{k-1}$ and $\Delta\phi_k$ as discussed more fully below. Hence, the second set 40 of correlators 42, 44, 46, and 48 provides means for correlating the second difference phase $e^{j\Delta\phi_k}$ with plural possible values thereof to provide a first plurality of intermediate output signals.

A third circuit 50 is provided for creating a third difference phase $e^{j(\Delta\phi_k+\Delta\phi_{k-1})}$ between the first and third received symbols $r_{k-2}$ and $r_k$, respectively. The third circuit 50 includes a third correlator 52 which correlates the third received symbol $r_k$ with the first received symbol $r_{k-2}$. The first received symbol $r_{k-2}$ is provided by the first delay circuit 16 and a third conjugating circuit 54. The output of the third correlator is the phase difference between the first and third received symbols (or alternatively, the sum of the first and second phase differences).

The output of the third correlator is provided to a third set 60 of intermediate correlators of which four are shown 62, 64, 66 and 68. Each of the third set 60 of intermediate correlators 62, 64, 66 and 68 correlate the third difference phase $e^{j(\Delta\phi_k+\Delta\phi_{k-1})}$ with a different possible value thereof $e^{-j2\beta_0}$, $e^{-j(\beta_0+\beta_1)}$, $e^{-j(\beta_j+\beta_m)}$, and $e^{-j2\beta_{M-1}}$, etc., and provides a third plurality of intermediate output signals from which a third contribution is made to the ultimate joint decision on $\Delta\phi_{k-1}$ and $\Delta\phi_k$ as discussed more fully below.

$M^2$ summers are provided, (where M = the number of phase states possible). of which one 70 is shown, for combining each of the first plurality of intermediate outputs with each of the second plurality of intermediate outputs and each of the third plurality of intermediate outputs to provide a plurality of possible output values for jointly deciding on the phases $\Delta\phi_{k-1}$ and $\Delta\phi_k$. The summers 70 sum the correlation combinations provided by the first, second and third circuits 20, 40, and 60, respectively. That is, each summer receives an input from one of the intermediate correlators of each of the first, second and third circuits, i.e., 26, 46, and 66. With one summer 70 provided for each of the possible combination of correlator outputs, $M^2$ summers total are provided. Note that each output of the third circuit 60 is connected to only one summer, whereas, each output of the first and second circuits 20 and 40 are connected to M summers. For example, if the second output of the third circuit 60 is connected to a second summer, then the first output of the second circuit 40 and the second output of the first circuit 20 should be connected to the second summer. It should be noted that the $M^2$ phasors needed to perform the phase rotations of the output $r_k(r_{k-2})^*$ can be obtained using a matrix which performs all possible multiplications of the M phasors $e^{-j\beta_0}$, $e^{-j\beta_1}$, ..., $e^{-j\beta_{M-1}}$ with themselves.

The output of each summer 70 is input to a decision circuit 80 which provides means for making a joint decision on $\Delta\phi_{k-1}$ and $\Delta\phi_k$ by choosing, from the plurality of possible output values, the value which represents the best combined correlation of the first, second and third difference values with the possible values thereof. The decision circuit 80 may be implemented as a comparator. As shown in FIG. 2 the outputs of the summers 70 are represented by $\xi_{00}$, $\xi_{01}$, $\xi_{jm}$, etc., $\xi_{M-1,M-1}$. Thus, if $\text{Re}\{\xi_{jm}\}$ is the largest combined correlation input to the decision circuit 80, the decision circuit 80 chooses the phase difference corresponding to say $\beta_j$ for the output, phase difference $\Delta\phi_k$ and the phase difference $\beta_m$ for $\Delta\phi_{k-1}$.

Figure 3:
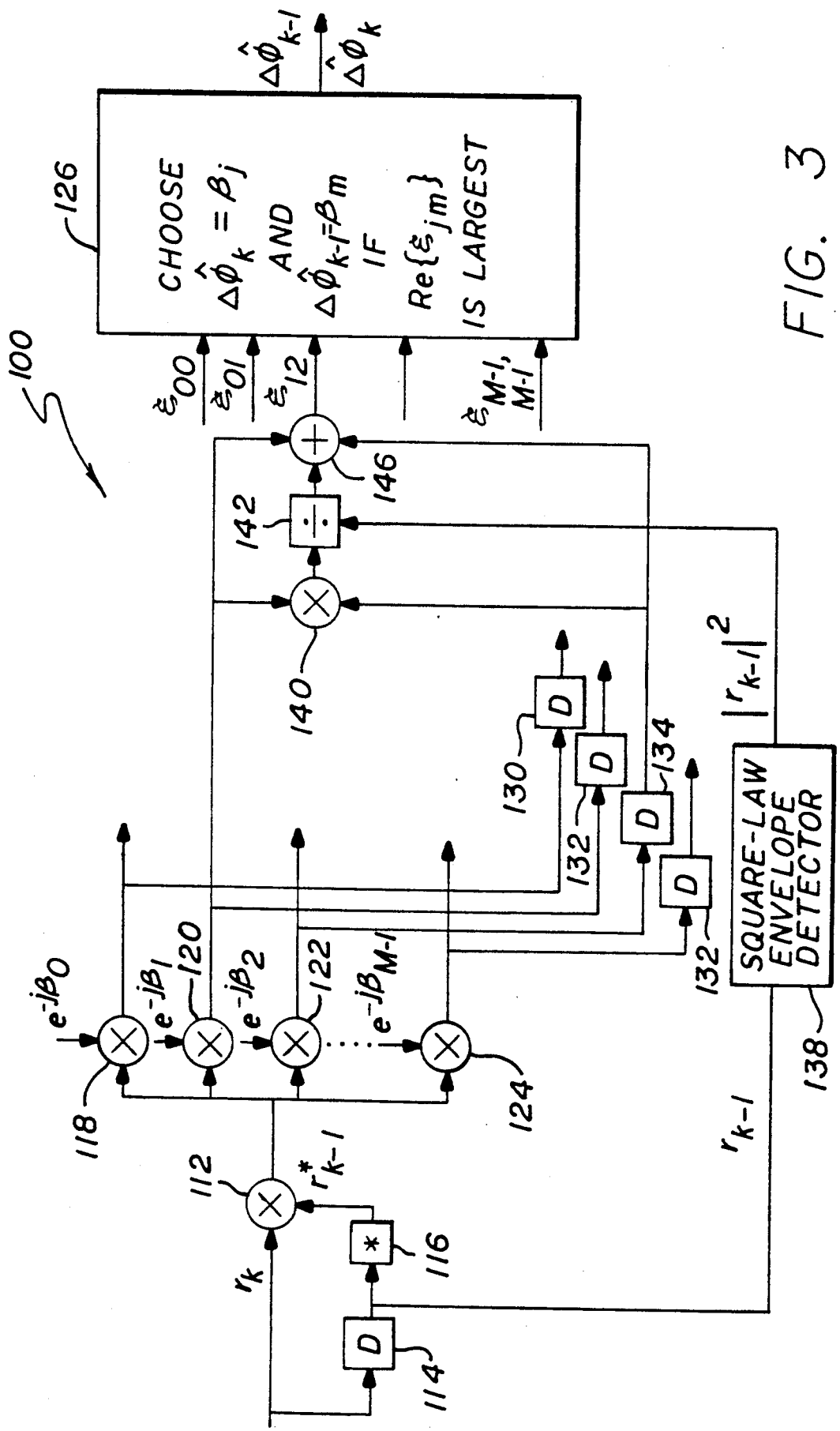
FIG. 3 is a functional block diagram in complex form of an illustrative serial implementation of a differential detector for MPSK signals constructed in accordance with the teachings of the present invention.

FIG. 3 is a functional block diagram in complex form of an illustrative serial implementation of a differential detector for MPSK signals constructed in accordance with the teachings of the present invention. Although simpler in appearance than the parallel implementation of FIG. 2, the serial implementation requires envelope normalization and additional delay elements.

Figure 4:
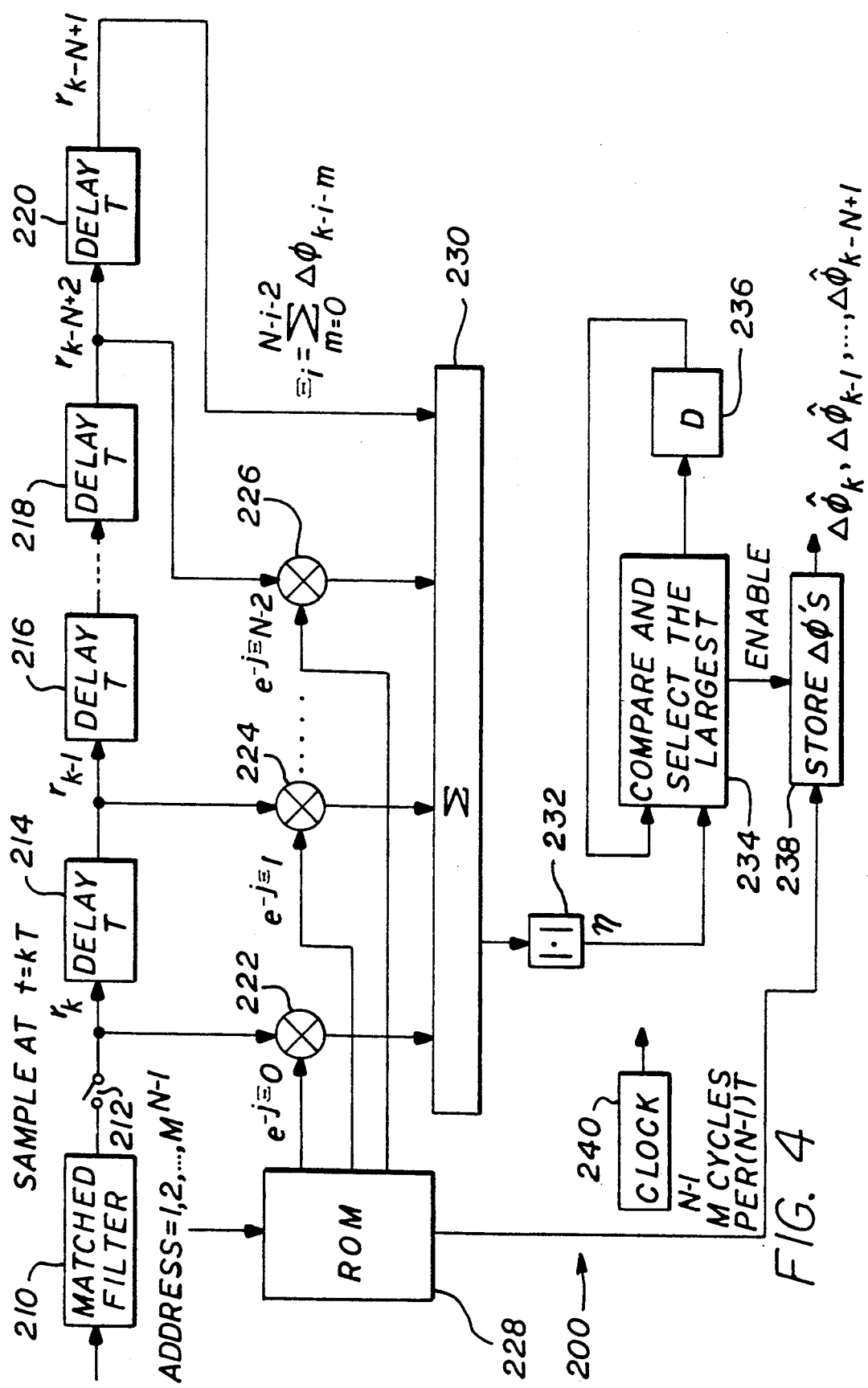
FIG. 4 is a functional block diagram in complex form of a second alternative embodiment of the differential detector for MPSK signals constructed in accordance with the teachings of the present invention.

FIG. 4 is a functional block diagram in complex form of a second alternative embodiment of the differential detector for MPSK signals constructed in accordance with the teachings of the present invention. The embodiment of FIG. 4 is a direct implementation of a receiver 200 that employs the decision rule of equation [15] above. Corresponding to each of the $M^{N-1}$ possible sequences $\Delta\phi_k$, $\Delta\phi_{k-1}$, ..., $\Delta\phi_{k-N+1}$, a set of N−1 values $\{\Xi_i; i=0, 1, 2, ..., N-1\}$ is computed in accordance with the definition of $\Xi_i$ given above by a matched filter 210, a sampler 212, delay circuits 214, 216, 218, and 220, a ROM 228 and correlators 222, 224, ..., and 226. The corresponding set of complex numbers $\{e^{j\Xi_i}; i=0, 1, 2, ..., N-1\}$ is output from the ROM 228 on each cycle.

The sequence $\Delta\phi_k$, $\Delta\phi_{k-1}$, ..., $\Delta\phi_{k-N+1}$, is also held in a buffer 238. The metric $\eta$ of equation [15] is computed each cycle by an envelope detector 232. The contents of the storage buffer 238 that holds the sequence $\Delta\phi_k$, $\Delta\phi_{k-1}$, ..., $\Delta\phi_{k-N+1}$, is updated (enabled) only when the value of $\eta$ corresponding to the current cycle is larger than any of the values corresponding to previous cycles as determined by a compare and select circuit 234 and a delay circuit 236. After $M^{N-1}$ cycles [corresponding to an interval of time (N−1)T], the sequence $\Delta\phi_k, \Delta\phi_{k-1}, \ldots, \Delta\phi_{k-N+1}$, corresponding to the largest value of $\eta$ is then output from the buffer 238 and represents the joint decision $\Delta\tilde{\phi}_k, \Delta\tilde{\phi}_{k-1}, \ldots, \Delta\tilde{\phi}_{k-N+1}$.

Thus, a differential detection technique for MPSK signals has been described herein which uses a multiple symbol observation interval on the basis of which a joint decision is made simultaneously regarding the phase of the received symbols. As such, the conventional assumption on the duration over which the carrier phase is constant must be extended to be commensurate with the extended observation interval. Nonetheless, the invention has been described with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly, What is claimed is:

1. A multiple symbol differential detection system comprising:
   first means for creating, a first difference phase between first and second symbols;
   second means for correlating said first difference phase with plural possible values thereof to provide a first plurality of intermediate output signals;
   third means for creating a second difference phase between second and third symbols;
   fourth means for correlating said second difference phase with plural possible values thereof to provide a second plurality of intermediate output signals;
   fifth means for creating a third difference phase between said first and third symbols;
   sixth means for correlating said third difference phase with plural possible values thereof to provide a third plurality of intermediate output signals;
   means for combining each of said first plurality of intermediate outputs with each of said second plurality of intermediate outputs and each of said third plurality of intermediate outputs to provide a plurality of possible output values; and
   means for making a joint decision by choosing from said plurality of possible output values the value which represents the best combined correlation of said first, second and third difference values with the possible values thereof.

2. The invention of claim 1 wherein said means for combining includes a plurality of summers, one associated with each possible combination of said first, second and third intermediate outputs and each providing one of said possible output values.

3. The invention of claim 2 wherein said means for making a joint decision includes a lookup table.

4. A multiple symbol differential detection technique including the steps of:
   a) creating a first difference phase between first and second symbols;
   b) correlating said first difference phase with plural possible values thereof to provide a first plurality of intermediate output signals;
   c) creating a second difference phase between second and third symbols;
   d) correlating said second difference phase with plural possible values thereof to provide a second plurality of intermediate output signals;
   e) creating a third difference phase between said first and third symbols;
   f) correlating said third difference phase with plural possible values thereof to provide a third plurality of intermediate output signals;
   g) combining each of said first plurality of intermediate outputs with each of said second plurality of intermediate outputs and each of said third plurality of intermediate outputs to provide a plurality of possible output values; and
   h) making a joint decision by choosing from said plurality of possible output values the value which represents the best combined correlation of said first, second and third difference values with the possible values thereof.

* * * * *